United States Patent [19]
Natori

[11] Patent Number: 4,908,717
[45] Date of Patent: Mar. 13, 1990

[54] IMAGE SCANNER USING A ROD-TYPE LIGHT SOURCE

[75] Inventor: Katsushi Natori, Kofu, Japan

[73] Assignee: Nippon Seimitsu Kogyo Kabushiki Kaisha, Kofu, Japan

[21] Appl. No.: 292,433

[22] Filed: Dec. 30, 1988

[30] Foreign Application Priority Data

Jun. 4, 1988 [JP] Japan .................. 63-137879
Jun. 8, 1988 [JP] Japan .................. 63-76103[U]
Jun. 8, 1988 [JP] Japan .................. 63-76104[U]

[51] Int. Cl.⁴ .................................. H04M 1/04
[52] U.S. Cl. ........................... 358/474; 358/484; 358/497
[58] Field of Search ............ 358/484, 497, 490, 474; 250/578; 350/96.1, 96.3

[56] References Cited

U.S. PATENT DOCUMENTS

| | | | |
|---|---|---|---|
| 2,639,322 | 5/1953 | Young | 358/468 |
| 3,726,998 | 4/1973 | Szpak et al. | 358/484 |
| 4,797,711 | 1/1989 | Sasada | 355/35 |

FOREIGN PATENT DOCUMENTS 65960 4/1982 Japan .................. 358/484
62-142465 6/1987 Japan .
62-161460 10/1987 Japan .

*Primary Examiner*—Edward L. Coles, Sr.
*Attorney, Agent, or Firm*—Oblon, Spivak, McClelland, Maier & Neustadt

[57] ABSTRACT

Transparent light-emitting rod and lamp united to constitute a light source unit are separately placed in an image reading region and a lamp moving region, so that the light-emitting rod can be brought close to a reading platen on which a given objective image sheet to be read is placed, irrespective of the size of the lamp, thereby to lessen the loss of desired light emitted from the light source. The image reading and lamp moving regions are separated by a shielding means so as to effectively remove inadequate heat generated by the light source, thereby to protect the component parts contained in an image scanner from the heat.

14 Claims, 6 Drawing Sheets

FIG_1 (Prior Art)
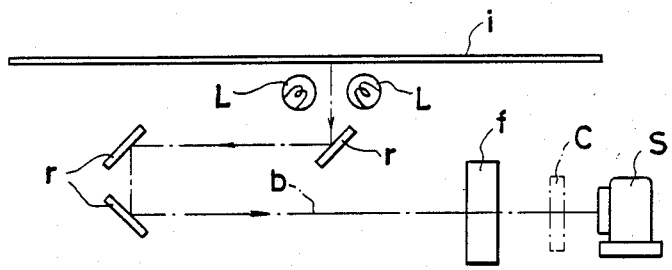
FIG_2
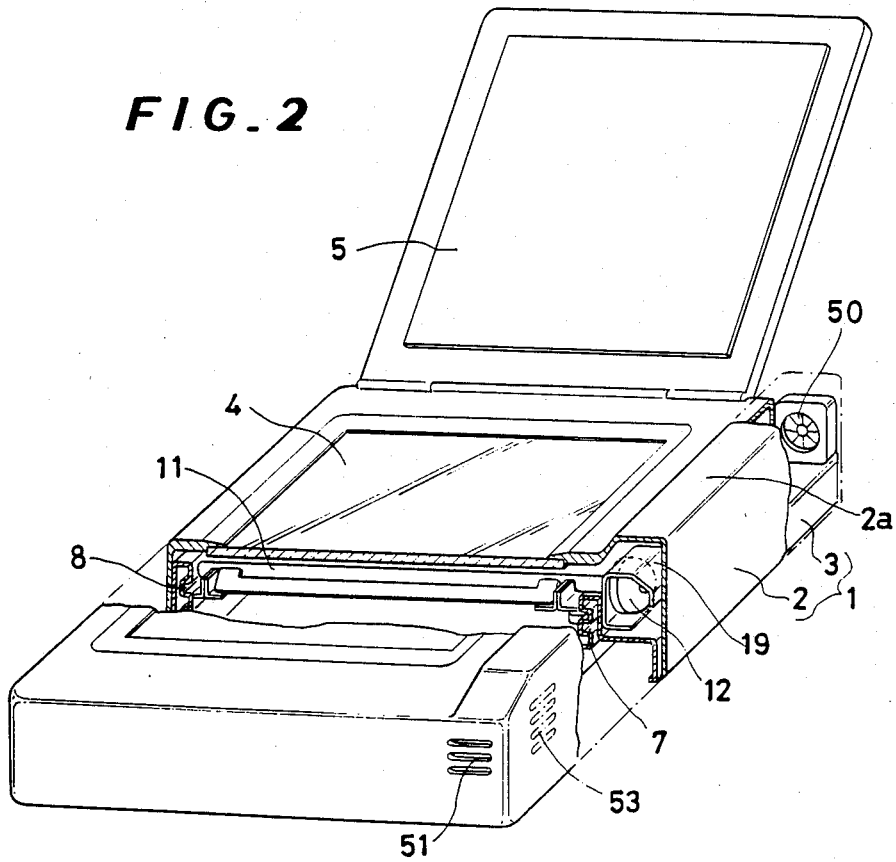

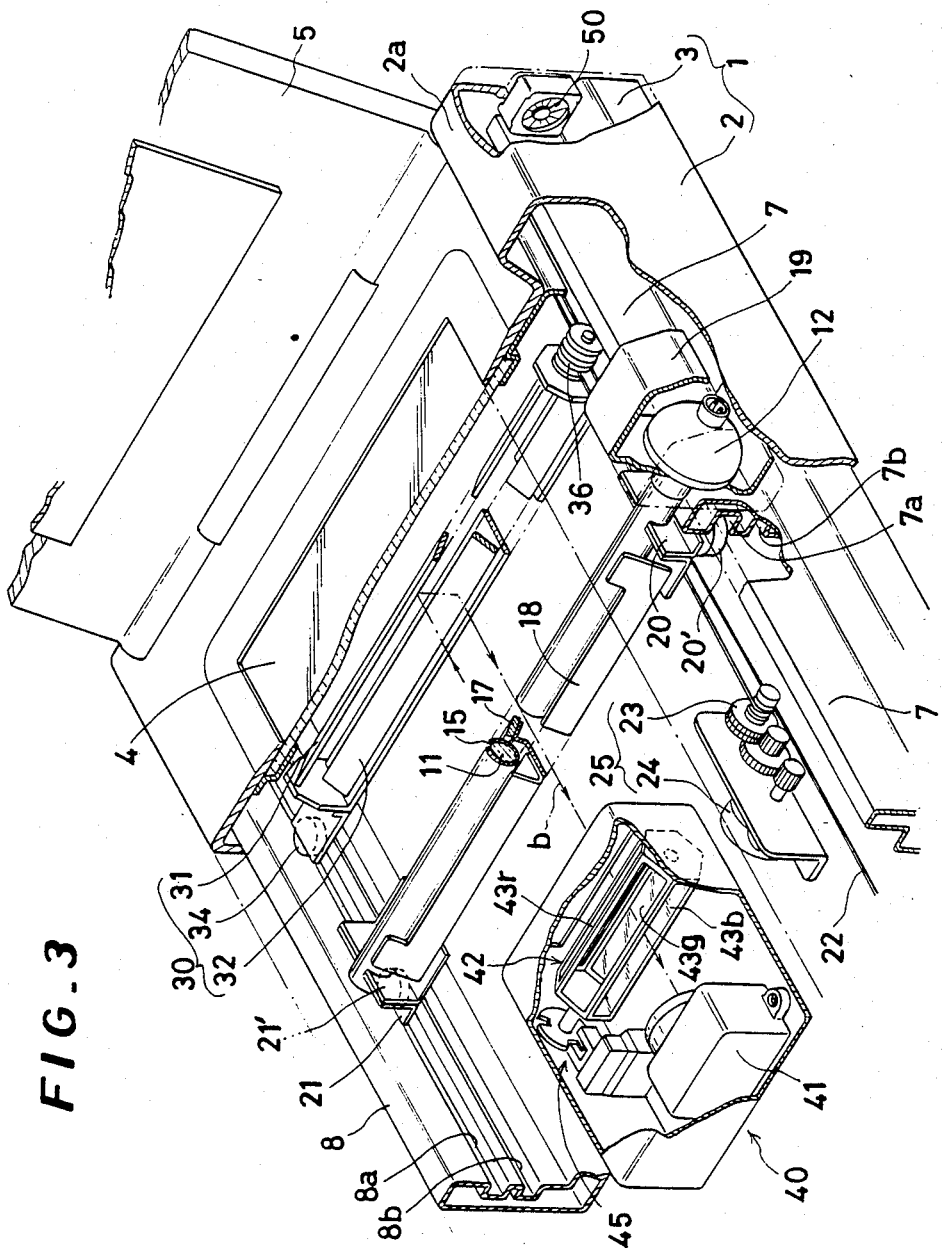
FIG_3

IMAGE SCANNER USING A ROD-TYPE LIGHT SOURCE

BACKGROUND OF THE INVENTION

1. Field of the Invention

This invention relates to an image scanner for reading a given objective image and outputting image data to image processing devices such as a computer, and more particularly, to an image scanner in which appropriate image scanning and reading for image processing can be carried out by use of a rod-type light source capable of emitting intense light without being influenced by undesirable heat generated by the light source.

2. Description of the Prior Art

Recently image scanners (image scanning and reading devices) are being increasingly used for the purpose of optically reading a given objective image by use of an image sensor such as a CCD line sensor and outputting image signals to various image processing devices including a computer, a copying machine and a facsimile. A fluorescent lamp which is generally used as a light source in the image scanner has suffered a disadvantage that the intensity of illumination around both end portions of the fluorescent glass tube of the lamp is remarkably reduced during prolonged use, consequently to make the distribution of light uneven. Besides, the intensity of illumination of the fluorescent lamp disadvantageously varies with the change of ambient temperature.

Furthermore, because the fluorescent lamp cannot radiate intense light, it is not applicable in a color image scanner as proposed by, for example, Japanese Utility Model Application Disclosure SHO 62-161460(A), in which a given color objective image is optically read by decomposing the given image into the three primary colors by use of three color filters. That is to say, in the color image scanner, as schematically illustrated in FIG. 1, a beam of image light b obtained by illuminating a given color objective image i with light from light sources L is directed to a color filter unit f via reflectors r and introduced into an image sensor s. In some cases, the image light b from the objective image i passes through an infrared-cut filter c for removing undesirable infrared ray component from the image light b. Accordingly, the image light b reaching the image sensor s is considerably reduced. Because of this, use of the fluorescent lamp entails problems such as lowering of the image scanning speed and deterioration of the quality of a reproduced image resultingly obtained.

It is possible in the image scanner of this type to employ a rod-type light source as proposed in Japanese Patent Application Public Disclosure SHO 62-142465(A) in place of the aforementioned fluorescent lamp. This known rod-type light source comprises a transparent rod with a diffusion stripe extending in the longitudinal direction of the rod and a light source lamp disposed at one end of the rod. By operating the light source lamp to emit light into the rod, the light which propagates inside the rod is diffused by the diffusion stripe and consequently radiate outside. Since the rod-type light source can employ a halogen incandescent lamp which emits intense light, it is available for image scanning of a color image.

In the image scanner, it is preferable to locate a light source as close as possible to a transparent reading platen on which a given original image sheet to be scanned is placed. This is because the intensity of the light impinging on the given image sheet is in inverse proportion to a square of the distance between the light source and the given image sheet. However, the halogen incandescent lamp is generally enveloped in a cup-like reflector in order to produce desirable intense light and therefore becomes large in overall size, though the transparent rod attached to the lamp is comparatively small in diameter. Therefore, this rod-type light source cannot be placed close to the reading platen, and the distance between the transparent rod from which the light is emitted and the reading platen could not be decreased. Thus, the conventional image scanner using the rod-type light source has been inferior in light efficiency and space factor.

In a case of using a high luminescent lamp such as the halogen incandescent lamp as a light source, some apprehension is caused by the influence of undesirable heat generated by the lamp on the component parts of the image scanner and the given original sheet to be read on the reading platen. For instance, as illustrated in FIG. 1, the infrared-cut filter c for eliminating thermal energy from the image light b is disposed at a distance from the light source L, so that the thermal energy contained in the image light b is mostly given forth when the image light b is propagating from the light source L to the image sensor S. Thus, the conventional image scanner has not sufficiently utilized the effect of the infrared-cut filter incorporated therein.

OBJECTS OF THE INVENTION

This invention was made to overcome the problems of prior art described above and aims to provide an image scanner using a rod-type high luminescent light source capable of emitting intense light, which can effect reliable image scanning and reading without being affected by heat generated by the light source and has a structure capable of bringing the light source close to a reading platen on which a given objective image sheet is placed, thereby to sufficiently improve the efficiency of illumination for reading the objective image.

Another object of the present invention is to provide an image scanner in which appropriate image scanning free from undesirable light leaking out from the rear of the high luminescent lamp can be carried out so as not to mar the quality of a reproduced image resultingly obtained and the undesirable heat can be effectively removed outside so as to protect component parts of the image scanner from the heat generated by the light source.

A further object of the present invention is to provide an image scanner having a light source structure incorporating an infrared-cut filter so that inadequate infrared rays containing thermal energy can be effectively cut off to minimize the thermal influence by the light from the light source, which is exerted on the given objective image and the component parts in the image scanner and attain compactness of the light source.

SUMMARY OF THE INVENTION

To accomplish the objects described above according to the present invention, there is provided an image scanner which comprises a light source unit including a transparent light-emitting rod and a light source lamp disposed at one end of the light-emitting rod, at least one guide rail means, and a light source driving means for allowing the light source unit to move parallel along the guide rail means.

An extent in which the light source unit moves parallel along the guide rail means is partitioned into an image reading region in which the light-emitting rod moves and a lamp moving region in which the light source lamp moves. The image reading region and the lamp moving region are defined with a shielding means. Thus, the light-emitting rod can be brought close to a reading platen on which the given objective image sheet to be read is placed, so that the loss of the light emitted from the light source to the objective image sheet can be lessened so as to use effectively the light from the light source because the optical length from the light source to the objective image sheet becomes short.

By the shielding means disposed between the image reading region and the lamp moving region, the image reading region can be shielded from not only undesirable heat generated by the light source lamp, but also inadequate light leaking out from the rear of the light source lamp. The guide rail means may be used as the shielding means between the image reading and lamp moving regions, so that the image scanner can be made simple in structure. In addition, a shielding plate or hood may be used as the aforementioned shielding means so as to shield the image reading region from the undesirable light leaking out and inadequate heat emitted from the light source.

Furthermore, the lamp moving region may be provided with ventilating means comprising a blowing fun disposed at one end portion in the lengthwise direction of the lamp moving region and a ventilating hole formed at the opposite end portion of the same and covered with a lattice, grill or the like. By this ventilating means, the light source lamp which generates intense heat can be forcibly cooled so that the component parts contained in the image scanner are not affected by the undesirable heat generated by the light source.

By incorporating an infrared-cut filter in the light source unit, infrared rays contained in the light from the light source can be effectively eliminated immediately the light is emitted from the light source so that the thermal influence of the light emitted from the light source can be effectively reduced.

The features of the present invention which are believed to be novel are set forth with particularity in the appended claims The present invention, both as to its organization and manner or operation, together with further objects and advantages thereof, may best be understood by reference to the following description, taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a schematic side view illustrating the optical system of a conventional image scanner;

FIG. 2 is a partially sectioned perspective view illustrating one embodiment of an image scanner according to the present invention;

FIG. 3 is a partially cutaway perspective view illustrating the principal portion of the image scanner of FIG. 2;

DESCRIPTION OF THE PREFERRED EMBODIMENT

Figure 4:
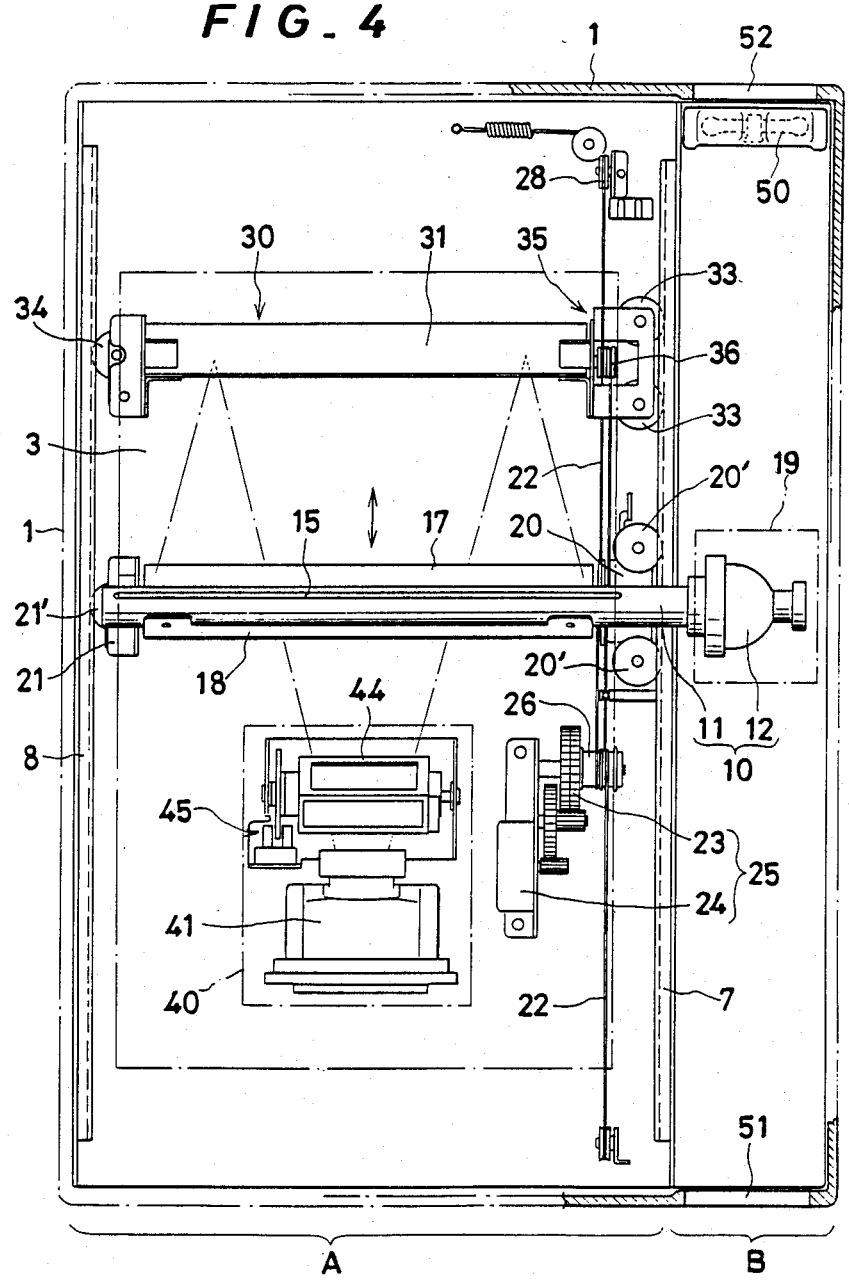
FIG. 4 is a schematic plan view of the same.

One preferred embodiment of the image scanner according to the present invention which employs a rod-type light source unit will be described hereinafter with reference to FIG. 2 through 5.

In the drawings, numeral 1 denotes a casing comprising a lid frame 2 and a base frame 3. The lid frame 2 is provided on its upper surface with a transparent reading platen 4 on which an objective image sheet is placed. At one edge portion of the upper surface of the lid frame 2, there is pivotally retained a press cover 5 for holding down the image sheet on the platen 4.

On the bottom of the base frame 3 which comes into engagement with the lid frame 2, there are formed a pair of raised guide rail means 7, 8 extending in the sub-scanning direction as indicated by the arrow in FIG. 4. In the illustrated embodiment, the interior of the casing 1 is partitioned by the guide rail means 7 into an image reading region A beneath the reading platen 4 and a lamp moving region B for a light source lame 12 which will be described later. The lamp moving region B is formed under an upwardly bulged portion 2a of the lid frame 2.

Numeral 10 denoted a light source unit which is mounted movably parallel along the guide rail means 7, 8 in the sub-scanning direction. This light source unit 10 comprises a light-emitting rod 11 made of transparent material such as quartz glass and the aforesaid light source lamp 12 attached to one end of the rod 11. The light-emitting rod 11 is provided at the other end thereof with a mirror face 13 and on its circumferential surface with a diffusion stripe 14 with high refractive index which extends in the longitudinal direction.

The light-emitting rod 11 is contained in a cylindrical guard member 16 having a light-radiating slit 15 extending in the longitudinal direction. The cylindrical guard member 16 has a specular inner surface. Thus, when the light source lamp 12 is turner on, the light emitted from the lamp 12 enters the rod 11 and is diffused by the diffusion stripe 14 while being repeatedly reflected by both and faces of the rod 11. As a result, the light thus diffused is released outside from the rod 11 in the opposite direction relative to the diffusion stripe 14 through the slit 14 formed in the cylindrical guard member 16, consequently to emit light spread in a line.

As the light source lamp 12, a halogen incandescent lamp or various high luminescent lamps can be used irrespective of size of the lamp.

The length of the light-emitting rod 11 of the light source unit 10 is slightly larger than the length (width) in the main scanning direction (transverse direction in FIG. 4) of the reading platen 4 when the light source unit 10 is movably mounted on the guide rail means 7 and 8, the light-emitting rod 11 is located in the image reading region A including the area of the reading platon 4 and the light source lamp 12 is contained in the bulged portion 2a which defines the lamp moving region B. Therefore, the light-emitting rod 11 can be brought close to the reading platen 4 even to the very limit so as to minimize the attenuation of the light emitted from the light source lamp 10 to the objective image placed on the platen. The angle of illumination by the light source is preferable 45° relative to the objective image face 4' on the platen 14 as shown in FIG. 4.

A first reflector means 17 is disposed parallel to and retained by the light-emitting rod 11 by means of a holding means 18 so that it is located just under the portion illuminated with the light source of the objective image face 4'.

In this embodiment, between the light-emitting rod 11 and light source lamp 12 which are connected to each other, a shielding hood 19 is used for enveloping the light source lamp 12. The shielding hood 19 has a substantially C-shaped section so as to open in the direction in which the light source moves. The light source lamp 12 emits not only desired light to be introduced in the rod 11 from the front thereof, but also undesirable light leaking out from the rear thereof, when being operated. However, by means of the hood 19, the image reading region A can be shielded from the undesirable light emitted rearward from the light source lamp 12.

A light source driving system for allowing the light source unit to move parallel along the guide rail means 7, 8 comprises carriages 20, 21 attached to both end portions of the rod 11, a cable 22 connected to the carriage 20, gears 23 for driving the cable 22, and a driving motor 24 for rotating the gears 23. These cable 22, gears 23 and motor 24 constitute a driving means 25. One of the carriages, 20, has a pair of guide rollers 20' rotatably fitted in a rail groove 7a formed in the guide rail means 7. The other carriage 21 has a guide roller 21' rotatably fitted in a rail groove 8a formed in the guide rail means 8.

The cable 22 connected to the carriage 17 which is driven by the driving means 25 is retained in the wound state by a driving pulley 26 attached to an output shaft on the gear 23 and stationary pulleys 27, 28 supported on the base frame 3. Moreover, to the cable 22 is connected a reflector unit 30 for compensating the light path. The reflector unit 30 moves parallel to an at half the speed at which the light source unit 10 moves in the sub-scanning direction so as to keep the light path (optical length from the objective image face 4' to an image receiving portion 40) constant. Since such a mechanism for driving the light source unit has been conventionally know, it is not described in detail here.

Figure 5:
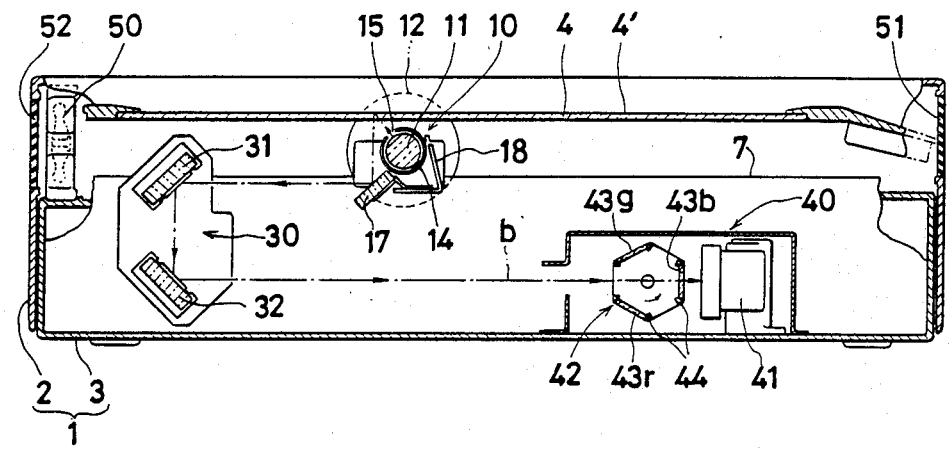
FIG. 5 is a schematic side view of the same.
Figure 6:
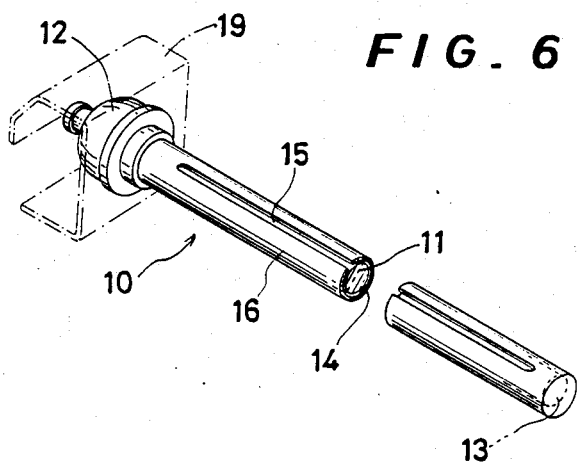
FIG. 6 is a partially sectioned perspective view of a rod-type light source unit used in the image scanner of the present invention.

The reflector unit 30 has a pair of second and third reflector means 31 and 32 which are respectively titled at 45° as illustrated in FIG. 5. The reflector unit 30 has a carriage 35 which is provided at one end thereof with a pair of guide rollers 33 fitted in a rail groove 7b formed in the guide rail means 7 and at the other end with a guide roller 34 fitted in a rail groove 8b formed in the guide rail 8.

The receiving portion 40 includes a color filter unit 42 for decomposing the image light into the three primary colors, and an image sensor 41 such as a CCD line image sensor. The color filter unit 42 comprises a red filter 43r, a green filter 43g and a blue filter 43b which are retained by a rotary frame 44 formed in the shape of a hexagonal prism. By rotating the filter unit 42, the beam of image light b from the objective image 4' passes through one of the filters 43r, 43g, 43b and reaches the image sensor 41, while distinguishing the filter through which the image light b passes by means of a filter-identifying detector 45. The image sensor 41 sequentially outputs image data signals synchronously with the filter-identifying detector 45. The image data signals contains signals for identifying the color of the filter through which the image light b passes, so that color image processing can be accomplished by the image processing device such as an external computer.

As is clear from the foregoing description, the image scanner according to the present invention can efficiently perform color image processing in such a manner that the given objective image face 4' on the reading platen 4 is illuminated with the light emitted from the light source unit 10 and spread in a line extending in the main scanning direction, consequently to obtain the image light reflected on the objective image face 4', and upon decomposing the image light from the objective image face 4' into the three primary colors by the color filter unit 42, the color-decomposed image data thus obtained is electrically converted and outputted in the form of quantized binary signals by the image sensor 41 such as the CCD line sensor.

Furthermore, the image scanner in this embodiment is provided with ventilating means comprising a blowing fun 50 disposed at one end wall portion of the casing 1 in the lengthwise direction of the lamp moving region B and a ventilating hole 51 formed in the other end wall portion of the lamp moving region B. Also in the wall portion of the casing 1 opposite to the inlet port of the blowing fun 50, there is formed a ventilating hole 52. These ventilating holes 51 and 52 may be covered with a lattice, grill or the like as illustrated in FIG. 1. In addition to the ventilating holes 51 and 52, there may of course be formed a side ventilating hole 53 as indicated by a chain line in FIG. 1. The location and size of the ventilating holes should not be understood as limitative, and the blowing fun 50 may be disposed on the front side of the casing 1 as a countermeasure.

Though the high luminescent light source such as the halogen incandescent lamp generates intense heat when being operated to illuminate, the intense heat thus generated can be discharged outside by operating the blowing fun 50 so as to forcibly cool the light source. Thus, the optical system and other component parts contained in the image scanner can be freed from the inadequate heat generated by the light source.

Figure 7:
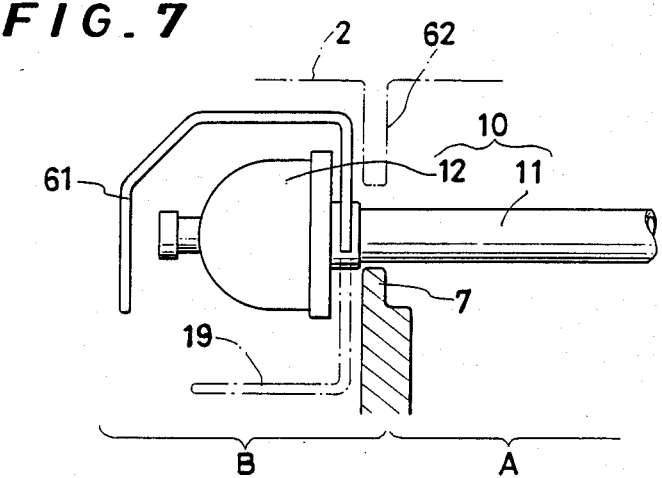
FIGS. 7 through 9 are schematic front views showing other embodiments of a shielding means used in the image scanner of the present invention.
Figure 8:
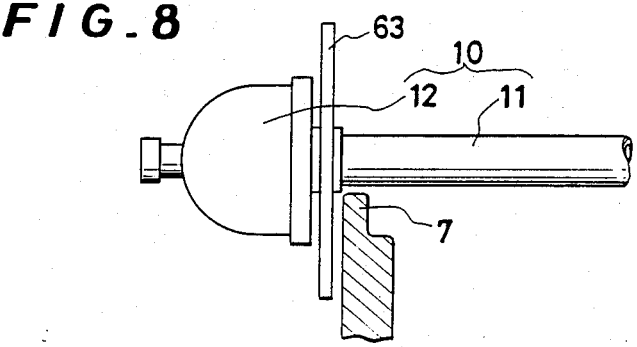
Figure 9:
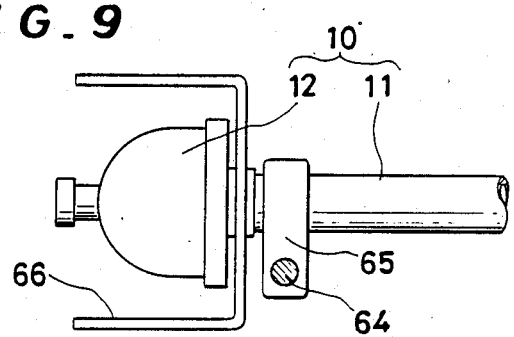

FIGS. 7 through 9 illustrate other embodiments of the shielding member which is attached to the light source unit.

The shielding means illustrated in FIG. 7 is composed of the guide rail means 7 for the light source unit 10 and a shielding hood 61 having a substantially inverted U-shaped section. Though the shielding hood having a substantially C-shaped section is employed in the foregoing embodiment, the shielding hood may of course be formed in any shape. Additionally, a parting wall 62 may be formed in the suspended state from the lid frame 2 so as to improve the shielding effect between the image reading region A and the lamp moving region B.

Another embodiment illustrated in FIG. 8 employs a shielding hood 63 formed in the shape of a plate. Even such a plate used as the shielding hood has the effect of preventing undesirable light leaking out from the rear of the light source lamp 12 and inadequate heat generated by the lamp 12 from entering the image reading region A.

In place of the guide rail means formed in the shape raised upward from the bottom of the base frame 3 as is employed in the foregoing embodiment, a rod-shaped guide rail means 64 may be used as shown in FIG. 9. The rod-shaped guide rail means 64 penetrates a retainer 65 fixed on the light-emitting rod 11 so as to support and allow the light source unit 10 to slidably move in the sub-scanning direction. In this embodiment, though the effect of partitioning off the image reading region A from the lamp moving region B may not sufficiently be expected, the image reading region A can be completely shielded from the undesirable light leaking out from the rear of the light source lamp 12 by use of a substantially C-shaped hood 66. Besides, the influence of heat brought about the light source lamp 12 can be reduced to some extent.

Figure 10:
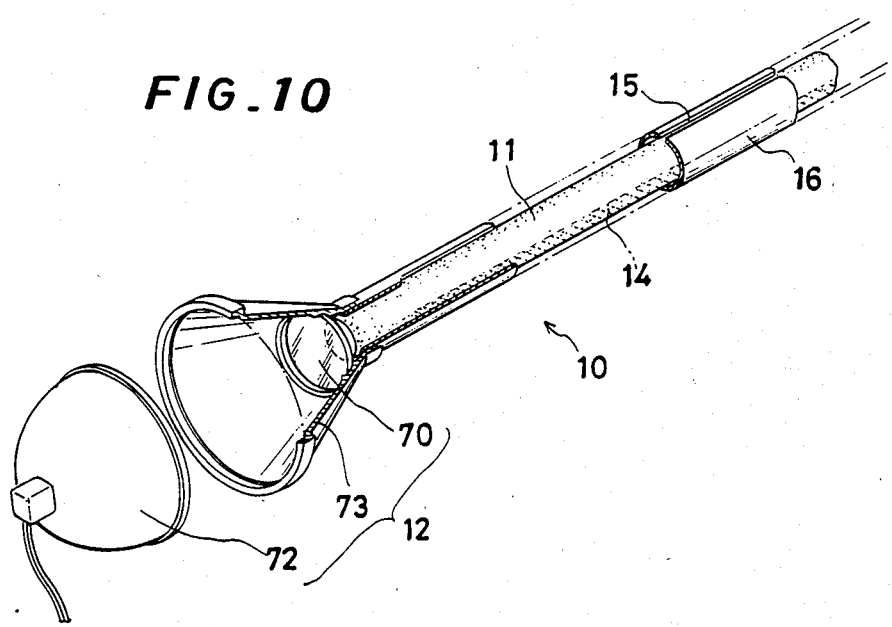
FIGS. 10 and 11 are partially cutaway perspective and plan views showing another embodiment of the rod-type light source unit according to the present invention.
Figure 11:
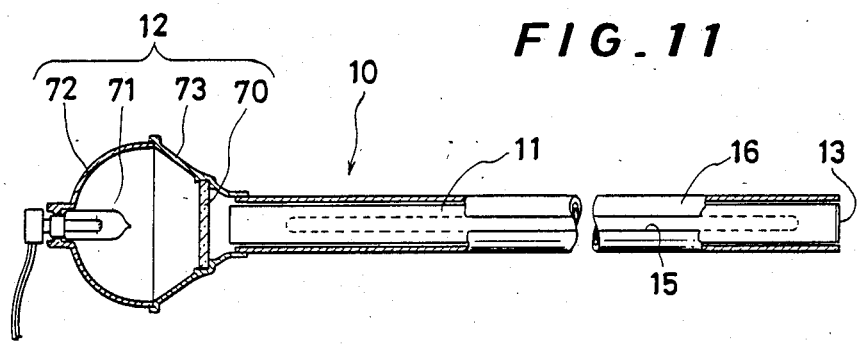

FIGS. 10 and 11 show still another embodiment in which an infrared-cut filter 70 is incorporated in the light source unit 10. In this embodiment, the elements indicated by like reference numerals with respect to those of the first embodiment have analogous structures and functions to those of the first embodiment and will not be described in detail again. The infrared-cut filter 70 is interposed between the light-emitting rod 11 and the light source lamp 12. To be more specific, the light source lamp 12 is composed of a lamp element 71 and a cup-like reflector 72 for enveloping the lamp element 71 and coaxially connected to the cylindrical guard member 16 for covering the light-emitting rod 11 through the medium of a substantially conical condenser means 73. The infrared cut filter 70 is mounted within the condenser means 73.

According to the light source unit of this embodiment, undesirable infrared components which are contained in the image light sent from the given objective image and have thermal energy and a harmful influence on the image light can be effectively cut off. That is to say, the beam of image light emitted from the rod 11 through the slit 15 formed in the cylindrical guard member 16 no longer contains the undesirable light components which unfavorably affect the image processing in the image sensor.

Also as will be understood from above, the quantity of the light emitted from the light-emitting rod 11 through the slit 15 formed in the guard member 16 depends on the width of the light diffusion stripe 14 with high refractive index formed on one part of the circumferential surface of the rod 11. However, to be exact, the distribution of the light passing through a condenser lens (not shown) incorporated in the image sensor 41 is not entirely constant even if the width of the diffusion stripe 14 is constant in the lengthwise direction of the rod. This phenomenon is commonly called "shading" which is caused by a strain in light distribution. Namely, the light passing through the end portions of the condenser lens of the image sensor is decreased in intensity in comparison with the light passing through the middle portion of the condenser lens.

Figure 12:
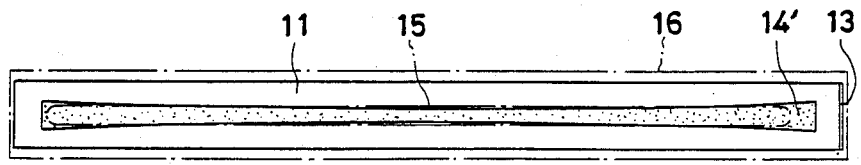
FIG. 12 is a schematic bottom view of still another embodiment of the rod-type light source unit according to the present invention.

In order to avoid the uneven concentration of light as noted above, the light-emitting rod 11 may preferably be provided with a light diffusion stripe 14' being gradually increased in width toward the end portions thereof as illustrated in FIG. 12. The rate of change in width of the light diffusion stripe 14' can be easily determined if by previously measuring the characteristics of distribution in light intensity of the rod 11. Thus, correction of the shading can be completely made by the light diffusion stripe 14' with variation in width.

As is clearly understood from the foregoing description of this invention, the image scanner using a rod-type high luminescent light source according to this invention enjoys outstanding advantages described below.

Since the light-emitting rod and the light source lamp are separately placed in the respective image reading and lamp moving regions, the light-emitting rod can be brought close to the reading platen for carrying the given objective image sheet to be read as required. Therefore, the loss of the light from the light source can be reduced because the optical length from the light source to the objective image becomes short. Besides, appropriate image scanning free form undesirable light leaking out from the rear of the high luminescent lamp so as not to mar the quality of a reproduced image resulting obtained.

Furthermore, by the ventilating means composed of a blowing fun provided at one end portion of the lamp moving region and ventilating holes formed in the opposite end portion of the same, the light source lamp which generates intense heat can be forcibly cooled and the component part of the image scanner are no longer affected by inadequate heat generated from the light source lamp, thereby to improve the performance reliability of image scanning.

By incorporating an infrared-cut filter in the light source unit, infrared rays contained in the light emitted from the light source can be effectively eliminated immediately the light is emitted from the light source so as to minimize the influence of thermal energy contained in the light emitted from the light source, which is exerted on the given objective image and the component parts in the image scanner, and additionally permit reduction in size and weight of the light source.

The image scanner according to the present invention has been so far described as being appropriate for use in color image processing, but it may of course be applied to the image processing for a monochrome image, and can be linked to various image processing devices.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. An image scanner for optically reading a given objective image and outputting image data signals, which comprises a casing, a light source unit including a transparent light-emitting rod and a light source lamp attached to one end of said light-emitting rod so as to emit light inside said light-emitting rod to thereby radiate outside a beam of light from said light-emitting rod, at least one guide rail means, a light source driving means for allowing said light source unit to move parallel along the guide rail means, and a shielding means for partitioning inside said casing into an image reading region in which said light-emitting rod moves and a lamp moving region in which said light source lamp moves.

2. An image scanner according to claim 1, wherein said guide rail means is formed with said shielding means.

3. An image scanner according to claim 1, further comprising a plate-like shielding hood disposed between said light-emitting rod and said light source lamp.

4. An image scanner according to claim 1, further comprising a shielding hood having a substantially inverted U-shaped section, said hood being disposed between said light-emitting rod and said light source lamp.

5. An image scanner according to claim 1, further comprising a shielding hood having a substantially C-shaped section, said hood being disposed between said light-emitting rod and said light source lamp.

6. An image scanner according to claim 1, wherein said light-emitting rod is provided on its circumferential surface with a diffusion stripe having high refractive index and extending in the longitudinal direction, and further comprising an infrared-cut filter disposed between said light source lamp and said light-emitting rod for removing infrared components from the light emitted from the light source lamp.

7. An image scanner according to claim 1, wherein said light-emitting rod is provided on its circumferential surface with a light diffusion stripe being gradually increased in width toward the end portions of said rod.

8. An image scanner according to claim 1, wherein said light-emitting rod is contained in a cylindrical guard member having a slit extending in the longitudinal direction, and said light source lamp is composed of a lamp element and a reflector for enveloping said lamp element and a condenser means in which an infrared-cut filter is mounted.

9. An image scanner according to claim 8, wherein said light-emitting rod is provided on its circumferential surface with a light diffusion stripe being gradually increased in width toward the end portions of said rod.

10. An image scanner for optically reading a given objective image and outputting image data signals, which comprises a casing; at least one guide rail means disposed in said casing; a light source unit including a transparent light-emitting rod and a light source lamp attached to one end of the light-emitting rod so as to emit light inside the light-emitting rod to thereby radiate outside a beam of light from said light-emitting rod, said light source unit being disposed movably parallel along said guide rail means; a light source driving means for allowing said light source unit to move parallel along said guide rail means; and a shielding hood for enveloping said light source lamp, said shielding hood being open in the direction in which said light source moves.

11. An image scanner according to claim 10, wherein said guide rail is disposed for partitioning inside said casing into an image reading region in which said light-emitting rod moves and a lamp moving region in which said light source lamp moves, and further comprising a blowing fun disposed at the rear or front end portion of said lamp moving region and a ventilating hole formed at the opposite end portion of said lamp moving region.

12. An image scanner according to claim 10, wherein said light-emitting rod is provided on its circumferential surface with a diffusion stripe having high refractive index and extending in the longitudinal direction, and further comprising an infrared-cut filter disposed between said light source lamp and said light-emitting rod for removing infrared components from the light emitted from the light source lamp.

13. An image scanner according to claim 12, wherein said light source lamp is composed of a lamp element and a cup-like reflector for enveloping said lamp element and a substantially conical condenser means in which said infrared-cut filter is incorporated.

14. An image scanner according to claim 10, wherein said light-emitting rod is provided on its circumferential surface with a light diffusion stripe being gradually increased in width toward the end portions of said rod.

* * * * *